United States Patent Office 3,358,065
Patented Dec. 12, 1967

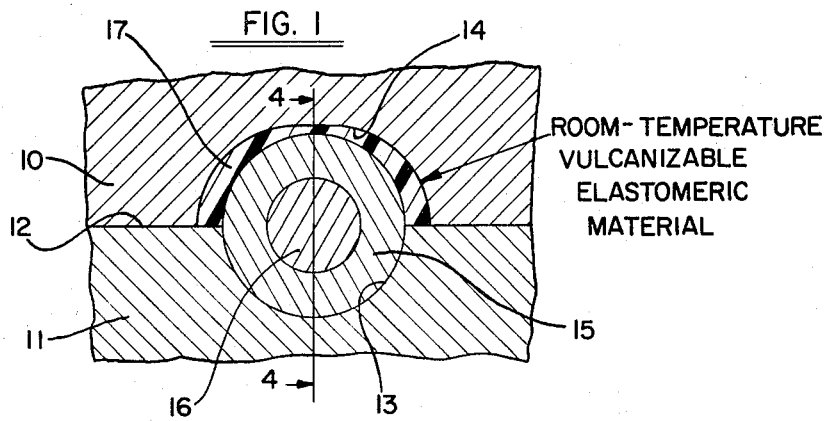
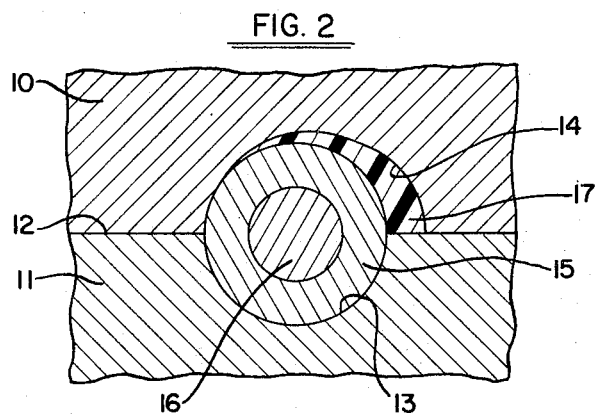
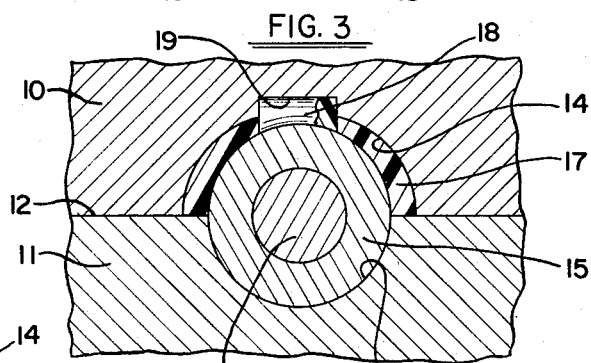
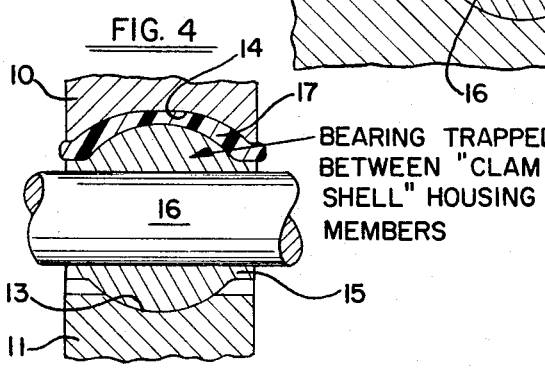

3,358,065
METHOD OF RETAINING A BEARING
Sherwood G. Enders, Bowleys Quarters, Md., assignor to The Black and Decker Manufacturing Company, Towson, Md., a corporation of Maryland
Filed Oct. 21, 1965, Ser. No. 499,481
4 Claims. (Cl. 264—262)

The present invention relates to a method of retaining a bearing between separate housing members, and more particularly, to a method of retaining a bearing in respective seats formed in a "clam shell" housing structure having complementary mating halves detachably secured together along a common longitudinal midplane.

While not necessarily confined thereto, the present invention finds particular utility in a "clam shell" portable electric tool; for example, a "clam shell" finishing sander as shown in the Enders Patent 3,199,251, a "clam shell" jig saw as shown in the McCarty et al. Patent 3,203,742.

It is an object of the present invention to utilize an elastomeric material, one which is preferably vulcanizable at room temperatures, wherein the elastomeric material is disposed in the space between the outer surface of the bearing and its bearing seat, and wherein the elastomeric material may be deformed at least partially while in its plastic state so as to conform to the space between the bearing and its seat thereby compensating for misalignments and tolerance accumulations, with the elastomeric material thereafter curing to a substantially solid state so as to provide a resilient support for the bearing.

It is another object of the present invention to provide a convenient and economical method of retaining bearings in "clam shell" housing structures, and more particularly, to a method of using a room-temperature vulcanizable silastic compound, usually referred to in the art as "RTV," as the resilient bearing support.

In accordance with the preferred teachings of the present invention, there is herein illustrated and described, a method of retaining a bearing in a "clam shell" housing including a "top" half and a "bottom" half detachably secured together along a common longitudinal midplane. Each of the mating halves is provided with a partially completed bearing seat, which communicate with one another when the mating halves are brought together to form a bearing seat. A bearing, preferably a spherical sleeve bearing, is seated in the bearing seat; and the seat in the top mating half is radially enlarged over that in the bottom mating half, such that the bearing fits substantially snug in the bottom half and has a space with respect to the seat in the top half. The improved method comprises, first, providing an elastomeric material in a substantially plastic state in the space between the bearing and its radially-enlarged seat in the top mating half of the housing, and secondly, securing the mating halves of the housing together with the bearing and the elastomeric material therebetween. In this manner, the elastomeric material may be deformed (at least partially) in conforming to the space between the bearing and its seat as the mating halves are secured together, and thereafter, the elastomeric material cures to a substantially solid state so as to provide a resilient support for the bearing. Preferably, but not necessarily, the elastomeric material is room-temperature vulcanizable and is allowed to acquire a partial "set" before the bearing is placed in its seat and the housing members secured together.

These and other objects of the present invention will become apparent from a reading of the following specification, taken in conjunction with the enclosed drawings, in which:

FIGURE 1 is a cross-sectional view showing a bearing preferably a spherical bearing, for journaling a shaft; a pair of separate housing members to retain the bearing therebetween; and the vulcanizable elastomeric material disposed between the bearing and preferably one of its seats, namely, an enlarged seat in the top housing member;

FIGURE 2 corresponds substantially to that of FIGURE 1, but shows the manner in which the elastomeric material compensates for misalignments or tolerance accumulations between the detachable housing members, the bearing seats formed therein, the bearing, and the shaft;

FIGURE 3 corresponds substantially to that of FIGURE 1, but shows a modified form in which a cylindrical rubber plug is used in addition to the elastomeric deformable material; and FIGURE 4 is a section view taken along the lines 4—4 of FIGURE 1.

With reference to FIGURE 1, there is illustrated a pair of housing members 10 and 11 joined together by any suitable means along a common plane 12. The housing members have respective partially-completed bearing seats 13 and 14 formed therein, and the seats communicate with one another to form a bearing seat for the bearing 15. The bearing 15 journals the shaft 16. Preferably, the bearing seat 14 in the top housing member 10 is radially enlarged as shown in FIGURE 1, with the clearances shown on the drawing being exaggerated somewhat for ease of illustration.

An elastomeric material 17, while still in a substantially plastic state, is disposed in the space between the bearing 15 and the bearing seat 14. This may be done, for example, by coating the bearing seat 14 prior to assembly. The bearing is then inserted in its lower bearing seat 13 so as to journal the shaft 16, and the housing members 10 and 11, or equivalent retainers, are secured together by suitable means. The elastomeric material 17, since it is in its substantially plastic state, may be deformed (if necessary and at least partially) in conforming to the space between the bearing 15 and its seat 14 as the housing members 10 and 11 are secured together. Thereafter, the elastomeric material 17 cures to a substantially solid state to provide a resilient support for the bearing 15. In this manner, the elastomeric material 17 provides a means for compensating for misalignments or tolerance accumulations in the "fit up" of the parts, that is, between the housing members, seats, bearing, and shaft; and this compensating means, moreover, is customized for each particular product, that is, for each and every manufactured tool or other article.

In this regard, the present invention is distinguished from the prior art, which has resorted to a variety of "caps" or "boots" formed from rubber, plastic, or a suitable resilient material. These prior art retainers, being designed for a particular situation, that is, for a given range of tolerance build-up, are not sufficiently flexible to cover virtually any conceivable tolerance situation that may be encountered in a manufactured product; and it is this "customizing" feature of the present invention which provides an important advantage, one not available with the prior art methods and designs.

Nor should the prevent disclosure be confused with the prior art use of Babbitt metals, such as molten lead, which is poured around a shaft. There, the lead forms the bearing itself, and is not a resilient retainer for an existing bearing.

The vulcanization (or curing) of the elastomeric material 17 may take place at any feasible temperature; preferably, however, it occurs at room temperature. A suitable material which may be utilized for this purpose is conveniently referred to as "RTV" silastic compound, "RTV" standing for "room temperature vulcanized." The elastomeric material 17, experience has indicated, need not necessarily adhere to either the bearing 15 or to the bearing seat in the housing. Adhesion may be desirable, but is not really necessary to achieve good results. Moreover, the elastomeric material 17 is shown as applied only to the bearing seat 14 in the top half; it could, however, be applied to any substantial portion of the seat, or to both seats 13 and 14. Preferably, however, the bearing 15 has a fairly snug fit in the bearing seat 13 in the lower housing 11; this is desirable to insure good heat conductivity from the bearing to the housing. It is also desirable in some applications to allow the elastomeric material to acquire a partial "set" prior to assembly of the housing members together.

The manner in which the elastomeric material 17 may conform while in its plastic state is illustrated in FIGURE 2, wherein the tolerance build-up has been exaggerated somewhat.

In FIGURE 3, a modification is illustrated; there, a rubber plug 18 is utilized in addition to the elastomeric material 17. This rubber plug 18 is seated in a semi-cylindrical pocket or recess 19 in the top housing member 10 prior to the application of the elastomeric material 17. The purpose of the rubber plug is to engage the top surface of the bearing 15 and to exert a force on the bearing along an axis which is substantially transverse to the common plane 12 between the housing members 10 and 11, thereby centering the bearing while the elastomeric material flows arounrd the top of the bearing prior to its curing cycle. The use of the rubber plug 18 may be desirable in some applications, but not mandatory.

As shown in FIGURE 4, the bearing 15 is preferably of the spherical type, with the seats 13 and 14 communicating with one another to form a spherical seat for the bearing.

The housing members 10 and 11, as previously noted, may comprise the "top" half and the "bottom" half, respectively, of a "clam shell" housing for a portable electric tool. The shaft 16 may comprise the armature shaft of the tool, and may be journaled within self-aligned spherical bearings; and the bearings may be retained between the "clam shell" mating halves which join together along a common longitudinal midplane as shown in the aforesaid Enders Patent 3,199,251. Moreover, the bearing 15 may comprise a spherical sleeve bearing as shown, or may comprise any suitable bearing, such as a needle bearing retained in a sleeve or adapter having an outer spherical surface.

Obviously, many modifications may be made without departing from the basic spirit of the present invention; and accordingly, within the scope of the appended claims, the invention may be practiced other than has been specifically described herein.

I claim:

1. The method of retaining a bearing between separate housing members, at least one of which is provided with a bearing seat, comprising:

(a) providing an elastomeric material in a substantially plastic state in the space between the bearing and its seat; and
    (b) securing the housing members together with the bearing and the elastomeric material therebetween;
    (c) whereby the elastomeric material may be deformed at least partially in conforming to the space between the bearing and its seat as the housing members are secured together; and
    (d) curing the elastomeric material to a substantially solid state to provide a resilient bearing support.

2. The method of retaining a bearing between "clam shell" housing members adapted to be secured together along a common longitudinal midplane, each of said housing members having a bearing seat formed therein, comprising:

(a) providing a room-temperature vulcanizable elastomeric material in a substantially plastic state in the space between the bearing and at least one of its seats; and
    (b) securing the housing members together with the bearing and the elastomeric material therebetween;
    (c) whereby the elastomeric material may be deformed at least partially in conforming to the space between the bearing and its seat as the housing members are secured together; and
    (d) curing the elastomeric material at room temperature to a substantially solid state to provide a resilient bearing support.

3. The method of claim 2, wherein:

(a) the bearing seat is coated with the elastomeric material; and the elastomeric material, while still in its deformable substantially plastic state, is allowed to acquire a partial "set" before the housing members are secured together.

4. The method of claim 2, wherein:

(a) the bearing seat in one of the housing members is radially enlarged over that in the other housing member; and wherein:
    (b) the elastomeric material is disposed entirely in the enlarged bearing seat in said one housing member.

References Cited

UNITED STATES PATENTS

| | | | |
|---|---|---|---|
| 747,042 | 12/1903 | Bradley | 29—149.5 |
| 2,606,759 | 8/1952 | Hutton | 308—26 X |
| 2,628,416 | 2/1953 | Sampson | 264—262 X |
| 2,697,010 | 12/1954 | Hirschmugl | 264—269 X |
| 3,098,698 | 7/1963 | Glynn | 264—261 |

ROBERT F. WHITE, *Primary Examiner.*

T. J. CARVIS, *Assistant Examiner.*